United States Patent
Levi et al.

(10) Patent No.: US 11,218,415 B2
(45) Date of Patent: Jan. 4, 2022

(54) LOW-LATENCY PROCESSING OF MULTICAST PACKETS

(71) Applicant: MELLANOX TECHNOLOGIES TLV LTD., Ra'anana (IL)

(72) Inventors: Lion Levi, Yavne (IL); Amiad Marelli, Herzliya (IL); George Elias, Tel Aviv (IL); Oded Zemer, Tel Aviv (IL); Yoav Benros, Givataim (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 31 days.

(21) Appl. No.: 16/194,345

(22) Filed: Nov. 18, 2018

(65) Prior Publication Data

US 2020/0162397 A1 May 21, 2020

(51) Int. Cl.
*H04L 12/875* (2013.01)
*H04L 12/931* (2013.01)
*H04L 12/841* (2013.01)
*H04L 12/947* (2013.01)

(52) U.S. Cl.
CPC .......... *H04L 47/56* (2013.01); *H04L 47/28* (2013.01); *H04L 49/201* (2013.01); *H04L 49/25* (2013.01)

(58) Field of Classification Search
CPC ....... H04L 47/56; H04L 47/28; H04L 49/201; H04L 49/25
See application file for complete search history.

(56) References Cited

U.S. PATENT DOCUMENTS

| | | | | |
|---|---|---|---|---|
| 7,260,102 | B2 * | 8/2007 | Mehrvar | H04L 47/24 370/389 |
| 7,372,819 | B2 * | 5/2008 | Martin | H04L 45/12 370/252 |
| 7,583,601 | B2 * | 9/2009 | Yasukawa | H04L 45/12 370/238 |
| 7,764,665 | B2 * | 7/2010 | Rogers | H04L 47/283 370/352 |
| 7,929,527 | B2 * | 4/2011 | Ramakrishnan | H04L 69/40 370/389 |
| 8,054,822 | B2 * | 11/2011 | Hacena | H04W 56/0045 370/350 |
| 8,098,648 | B2 * | 1/2012 | Nakata | H04L 12/56 370/351 |

(Continued)

*Primary Examiner* — Huy D Vu
*Assistant Examiner* — Bailor C. Hsu
(74) *Attorney, Agent, or Firm* — Kligler & Associates Patent Attorneys Ltd

(57) ABSTRACT

A network element includes multiple ports and forwarding circuitry. The ports are configured to serve as network interfaces for exchanging packets with a communication network. The forwarding circuitry is configured to receive a multicast packet that is to be forwarded via a plurality of the ports over a plurality of paths through the communication network to a plurality of destinations, to identify a path having a highest latency among the multiple paths over which the multicast packet is to be forwarded, to forward the multicast packet to one or more of the paths other than the identified path, using a normal scheduling process having a first forwarding latency, and to forward the multicast packet to at least the identified path, using an accelerated scheduling process having a second forwarding latency, smaller than the first forwarding latency.

12 Claims, 3 Drawing Sheets

(56) References Cited

U.S. PATENT DOCUMENTS

| | | | | |
|---|---|---|---|---|
| 8,411,696 | B1* | 4/2013 | Ko | H04L 12/2869 |
| | | | | 370/419 |
| 8,737,206 | B2* | 5/2014 | Li | H04L 45/121 |
| | | | | 370/229 |
| 8,838,787 | B2* | 9/2014 | Gelter | H04N 21/64738 |
| | | | | 709/224 |
| 8,891,513 | B1* | 11/2014 | Huang | H04L 45/64 |
| | | | | 370/352 |
| 9,374,303 | B1* | 6/2016 | Ulman | H04L 49/201 |
| 9,641,465 | B1 | 5/2017 | Gabbay et al. | |
| 2002/0105914 | A1* | 8/2002 | Duron | H04L 43/0852 |
| | | | | 370/252 |
| 2004/0125803 | A1* | 7/2004 | Sangroniz | H04L 45/04 |
| | | | | 370/390 |
| 2009/0190569 | A1* | 7/2009 | Hacena | H04B 7/2684 |
| | | | | 370/350 |
| 2014/0269415 | A1* | 9/2014 | Banavalikar | H04L 45/24 |
| | | | | 370/254 |
| 2014/0269692 | A1* | 9/2014 | Flynn | H04L 41/0896 |
| | | | | 370/389 |
| 2015/0124821 | A1* | 5/2015 | Chu | H04L 45/24 |
| | | | | 370/392 |
| 2015/0207638 | A1* | 7/2015 | Basso | H04L 49/101 |
| | | | | 370/230 |
| 2015/0282023 | A1* | 10/2015 | Jovanovic | H04W 36/02 |
| | | | | 370/331 |
| 2016/0285744 | A1* | 9/2016 | Panchagnula | H04L 12/18 |
| 2017/0019168 | A1* | 1/2017 | Menard | G02B 6/3584 |
| 2017/0180270 | A1* | 6/2017 | Guim Bernat | H04L 49/201 |
| 2017/0237676 | A1* | 8/2017 | Sung | H04L 43/087 |
| | | | | 370/235 |

* cited by examiner

LOW-LATENCY PROCESSING OF MULTICAST PACKETS

FIELD OF THE INVENTION

The present invention relates generally to packet communication networks, and particularly to methods and systems for processing multicast packets.

BACKGROUND OF THE INVENTION

Various techniques for reducing the latency of packet forwarding in network elements are known in the art. For example, U.S. Pat. No. 9,641,465, whose disclosure is incorporated herein by reference, describes a switching device that includes a plurality of ports and a switching core, which is coupled to transfer data packets between ingress and egress ports. Switching logic maintains a descriptor queue containing respective descriptors corresponding to the data packets that have been received and queued by the ports, and responsively to the respective descriptors, instructs the switching core to transfer the queued data packets between the ports. Port logic, which is associated with each port, is configured, upon receipt of a data packet from the network at the port, to signal the switching logic to place a descriptor corresponding to the data packet in the descriptor queue and, upon identifying the data packet as meeting a predefined criterion, to convey a request to the switching logic, bypassing the descriptor queue, to instruct the switching core to transfer the data packet immediately to an egress port.

SUMMARY OF THE INVENTION

An embodiment of the present invention that is described herein provides a network element including multiple ports and forwarding circuitry. The ports are configured to serve as network interfaces for exchanging packets with a communication network. The forwarding circuitry is configured to receive a multicast packet that is to be forwarded via a plurality of the ports over a plurality of paths through the communication network to a plurality of destinations, to identify a path having a highest latency among the multiple paths over which the multicast packet is to be forwarded, to forward the multicast packet to one or more of the paths other than the identified path, using a normal scheduling process having a first forwarding latency, and to forward the multicast packet to at least the identified path, using an accelerated scheduling process having a second forwarding latency, smaller than the first forwarding latency.

Typically, the network element is interconnected with one or more peer network elements in accordance with a network topology, and the forwarding circuitry is configured to identify the path having the highest latency based on the network topology.

In some embodiments, the network element is interconnected with one or more peer network elements in accordance with a network topology having two or more layers, and the forwarding circuitry is configured to identify the path having the highest latency by identifying a path that leads to a peer network element belonging to a higher layer than the network element. In an embodiment, the forwarding circuitry is configured to forward the multicast packet using the accelerated scheduling process to the peer network element belonging to the higher layer, and to forward the multicast packet using the normal scheduling process to at least one peer network element belonging to a lower layer than the network element.

In another embodiment, the forwarding circuitry is configured to identify the path having the highest latency by retrieving the identity from an entry of a cache memory that was created in processing of a previous packet. In yet another embodiment, when unable to identify the path having the highest latency, the forwarding circuitry is configured to randomly select a path from among the multiple paths over which the multicast packet is to be forwarded, and to forward the multicast packet to the randomly selected path using the accelerated scheduling process.

There is additionally provided, in accordance with an embodiment of the present invention, a method for communication, including, in a network element, receiving a multicast packet that is to be forwarded via a plurality of ports over a plurality of paths through a communication network to a plurality of destinations. A path having a highest latency, among the multiple paths over which the multicast packet is to be forwarded, is identified. The multicast packet is forwarded to one or more of the paths other than the identified path, using a normal scheduling process having a first forwarding latency. The multicast packet is forwarded to at least the identified path, using an accelerated scheduling process having a second forwarding latency, smaller than the first forwarding latency.

There is further provided, in accordance with an embodiment of the present invention, a computer software product, the product including a tangible non-transitory computer-readable medium in which program instructions are stored, which instructions, when read by a processor in a network element that includes multiple ports, cause the processor to receive a multicast packet that is to be forwarded via a plurality of the ports over a plurality of paths through a communication network to a plurality of destinations, to identify a path having a highest latency among the multiple paths over which the multicast packet is to be forwarded, to forward the multicast packet to one or more of the paths other than the identified path, using a normal scheduling process having a first forwarding latency, and to forward the multicast packet to at least the identified path, using an accelerated scheduling process having a second forwarding latency, smaller than the first forwarding latency.

The present invention will be more fully understood from the following detailed description of the embodiments thereof, taken together with the drawings in which:

DETAILED DESCRIPTION OF EMBODIMENTS

Overview

Figure 1:
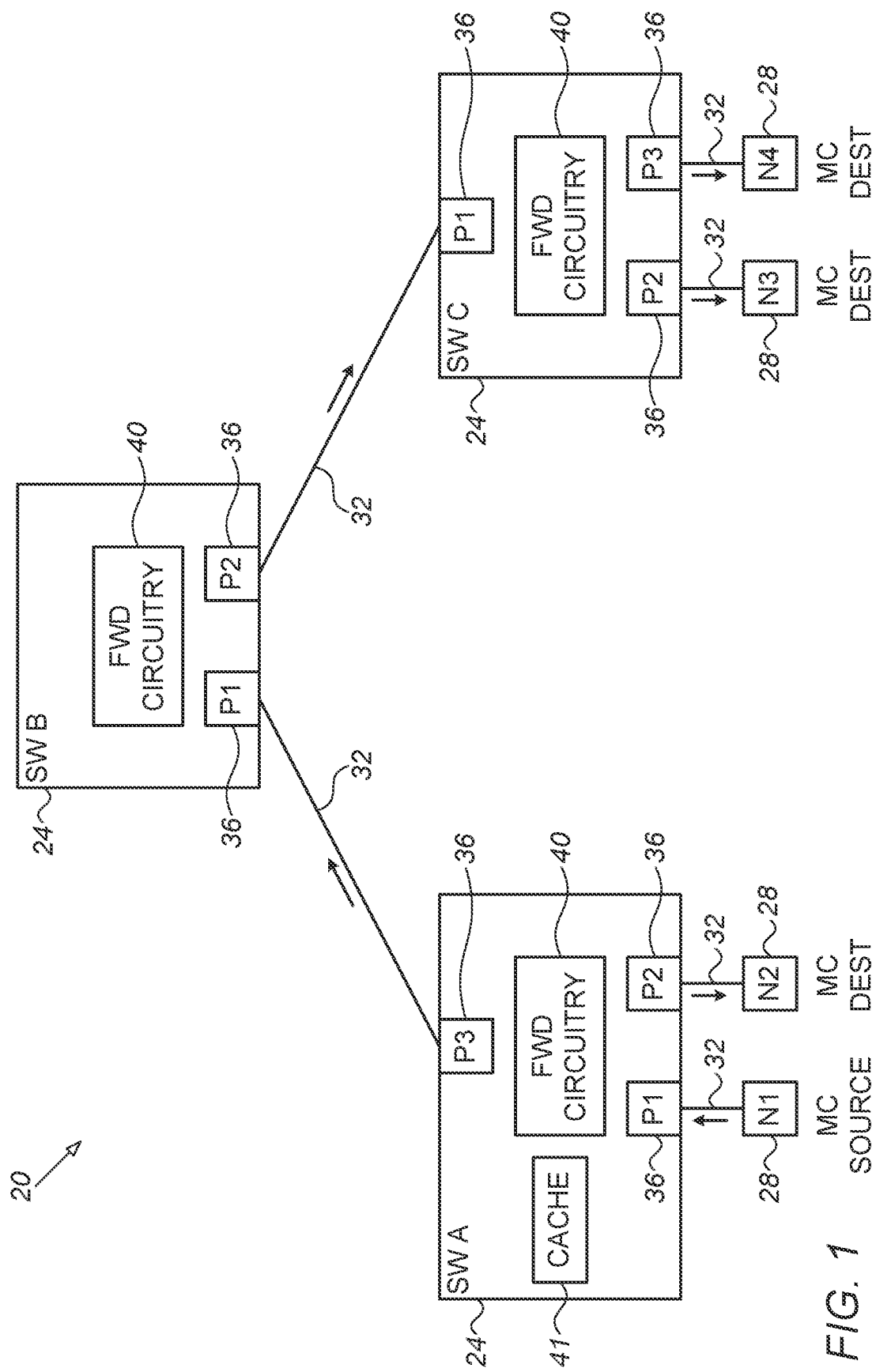
FIG. 1 is a block diagram that schematically illustrates a packet communication network that employs low-latency forwarding of multicast packets, in accordance with an embodiment of the present invention.

Embodiments of the present invention that are described herein provide improved methods and systems for forwarding of multicast (MC) packets in packet networks. In some embodiments, network elements such as switches reduce the latency of forwarding MC packets, by identifying high-latency paths based on knowledge of the network topology, and forwarding MC packets over these paths using a low-latency scheduling process.

In the context of the present patent application and in the claims, the term "multicast packet" refers to any packet that is destined to two or more recipients (also referred to as "destinations"), as opposed to a unicast packet that has a single recipient. Thus, for example, a broadcast packet, which is forwarded to all destinations across a network, is also considered a MC packet.

In some embodiments, a network element (e.g., a switch) comprises multiple ports for receiving and sending packets to and from a communication network, and forwarding circuitry that is configured to forward the packets between the ports. The forwarding circuitry supports two packet scheduling processes—a normal scheduling process and an accelerated scheduling process having smaller latency.

In some embodiments, the forwarding circuitry identifies that a certain received packet is a MC packet, e.g., by looking-up the egress port list for the packet. Based on knowledge of the topology of the network, the forwarding circuitry identifies the path having the highest latency among the multiple paths over which the MC packet is to be forwarded. In a Fat-Tree (FT) network, for example, the forwarding circuitry may identify the path going through an "up-port," i.e., the path leading to a switch on a higher layer of the FT network, as the highest-latency path. The forwarding circuitry forwards the MC packet to the identified highest-latency path (e.g., to the up-port) using the accelerated scheduling process. To other paths (e.g., to the down-ports), the forwarding circuitry forwards the MC packet using the normal scheduling process.

The forwarding scheme described above is given purely by way of example. Various other suitable schemes can be used in alternative embodiments. For example, the forwarding circuitry may use the accelerated scheduling process for more than just the single highest-latency path. Other identification criteria for the highest-latency path or paths, in FT networks or in any other suitable network topology, can also be used.

In some embodiments, the forwarding circuitry uses a caching mechanism in order to invoke the accelerated scheduling process with minimal delay. In an example embodiment, the first received packet in a MC flow is handled entirely by the normal scheduling process. As part of processing of the first packet, the forwarding circuitry creates a cache entry that specifies the flow and the highest-latency port. When subsequent packets of the MC flow arrive, the forwarding circuitry is able to determine the highest-latency port quickly by querying the cache, and in this manner forward the packets to the accelerated scheduling process virtually immediately and without any further lookup operations.

By reducing the latency of at least the highest-latency path, the disclosed techniques reduce the overall worst-case and average latency of forwarding MC packets. As such, the disclosed techniques are thus especially suitable for latency-sensitive MC-based services such as real-time trading applications, multi-processor High-Performance Computing (HPC) applications, and many others. The disclosed techniques are nevertheless useful in any other MC application.

SYSTEM DESCRIPTION

FIG. 1 is a block diagram that schematically illustrates a packet communication network 20 that employs low-latency forwarding of multicast (MC) packets, in accordance with an embodiment of the present invention. Network 20 and its elements may operate in accordance with any suitable network standard or protocol, such as Infiniband (IB) or Ethernet. The description that follows focuses on forwarding of MC packets, for the sake of clarity. In practice, network 20 typically handles both MC and unicast traffic.

Network 20 comprises multiple packet switches 24, which are connected to one another, and to multiple network nodes 28, by links 32. Each switch 24 comprises multiple ports 36, which serve as network interfaces that send and receive packets to and from peer switches 24, and/or to and from nodes 28. Each switch 24 further comprises forwarding circuitry 40, which carries out the MC packet forwarding techniques described herein.

In the present simplified example, network 20 comprises three switches 24 denoted SW_A, SW_B and SW_C, which serve four nodes 28 denoted N1, N2, N3 and N4. In real-life implementations, network 20 may comprise considerably larger numbers of switches, ports, nodes and/or links. Nodes 28 are also referred to as clients or endpoints, and may comprise any suitable type of computing device having network communication capabilities. Links 32 may comprise, for example, optical or copper links, as appropriate.

In a given implementation, network 20 has a certain network topology. In the example of FIG. 1, network 20 has a two-layer Fat-Tree (FT) topology. Switches SW_A and SW_C belong to a layer referred to as a leaf layer, and are also referred to as leaf switches. The leaf switches are connected to nodes 28. Switch SW_B belongs to a layer referred to as a spine layer, and is also referred to as a spine switch. The spine layer is considered higher than the leaf layer.

The example FT topology of FIG. 1 is a highly simplified topology, chosen for the sake of clarity. In alternative embodiments, the disclosed techniques can be implemented in FT networks having a larger number of layers, and a larger number of switches per layer. In such embodiments, at least one intermediate layer exists between the leaf layer and the spine layer. The intermediate layers are considered higher than the leaf layer and lower than the spine layer. Moreover, in FIG. 1 only a small number of ports is shown for each switch, for the sake of clarity, in order to focus on the example being explained.

In the present context, a port leading from a switch in one layer to a switch in a higher layer is referred to as an "up-port." A port leading from a switch in one layer to a switch in a lower layer (or to a network node in case of a switch in the leaf layer) is referred to as a "down-port." For example, port P3 of switch SW_A is an up-port, whereas ports P1 and P2 of SW_A are down-ports. Switch SW_B in this example, being a spine switch, has only down-ports.

Low-Latency Forwarding of Multicast Packets

Consider the example shown in FIG. 1. In this example, node N1 sends a flow of MC packets that should be forwarded to nodes N2, N3 and N4. For this flow, N1 serves as a MC source, while nodes N2, N3 and N4 serve as MC destinations. For each MC packet in the flow, duplicate copies are sent over three paths:

N1⇒SW_A (up), then SW_A⇒N2 (down).
N1⇒SW_A (up), then SW_A⇒SW_B (up), then SW_B⇒SW_C (down), then SW_C⇒N3 (down).
N1⇒SW_A (up), then SW_A⇒SW_B (up), then SW_B⇒SW_C (down), then SW_C⇒N4 (down).

In this example, the first path (N1⇒N2) has a relatively small latency. The second and third paths (N1⇒N3 and N1⇒N4) have a higher latency.

Consider switch SW_A. In an embodiment, upon receiving a packet belonging to the MC flow from N1 via port P1, forwarding circuitry 40 of SW_A looks-up the list of egress ports for this packet (in the present example P2 and P3). Forwarding circuitry 40 of SW_A may detect that the packet is a MC packet, for example, by identifying that the list of egress ports comprises more than a single port.

From among the list of egress ports, forwarding circuitry 40 of SW_A identifies the highest-latency port, i.e., the port leading to the highest-latency path. In the example of FIG. 1, port P3 is selected. In an embodiment, forwarding circuitry 40 of SW_A is aware that switch SW_A is part of a FT network, that port P3 is an up-port and that ports P1 and P2 are down-ports. Forwarding circuitry 40 of SW_A chooses the up-port as the highest-latency port. The criterion of choosing the up-port as the highest-latency port holds in general for any switch at any layer of any FT network, not only in the simplified example of network 20 of FIG. 1. For other network topologies, other selection criteria may apply.

Having identified the highest-latency port P3, forwarding circuitry 40 of SW_A forwards the MC packet to this port using an accelerated scheduling process. To P2, on the other hand, forwarding circuitry 40 of SW_A forwards the MC packet using a normal scheduling process.

In another example embodiment, forwarding circuitry 40 of SW_B may identify that the packet is to be forwarded over only a single egress port (P2). In response to detecting this "single-target" scenario, forwarding circuitry 40 of SW_B may forward the MC packet from P1 to P2 using the accelerated scheduling process.

In various embodiments, forwarding circuitry 40 may apply any suitable normal and accelerated scheduling processes. The normal and accelerated scheduling processes may differ from one another in any suitable way, as long as the latter has smaller latency than the former. In an example embodiment, the normal scheduling process queues the packets in a queue, while the accelerated scheduling process bypasses the queue. Examples of normal and accelerated scheduling mechanisms, which can be used by switches 24 for implementing the disclosed techniques, are described in U.S. Pat. No. 9,641,465, cited above.

Typically, forwarding circuitry 40 does not repeat the process above in its entirety for every packet in the MC flow. In some embodiments, forwarding circuitry 40 handles the first packet of the MC flow using the normal scheduling process, and during this stage caches relevant information in a cache memory 41. The cache memory typically comprises a suitable volatile memory associated with the ingress port. The cached information may comprise, for example, a tuple (a set of packet-header field values) that identifies the flow, the identification of the flow as a MC flow, the list of egress ports for the flow, and the identification of the highest-latency port. For subsequent packets of the flow (e.g., for packets that the forwarding circuitry identifies as matching the tuple), the forwarding circuitry obtains the identity of the highest-latency port from the cache, eliminating the computational complexity of re-identifying the highest-latency port per packet.

Figure 2:
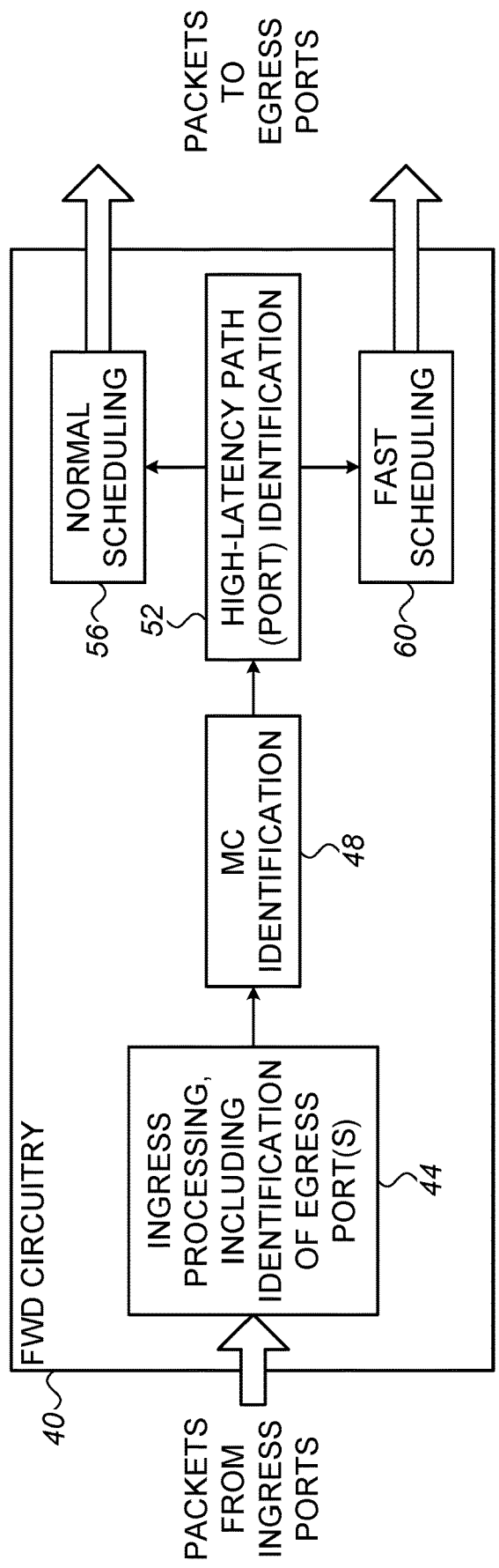
FIG. 2 is a block diagram that schematically illustrates forwarding circuitry in a packet switch, in accordance with an embodiment of the present invention.

FIG. 2 is a block diagram that schematically illustrates forwarding circuitry 40 of switches 24, in accordance with an embodiment of the present invention.

Figure 3:
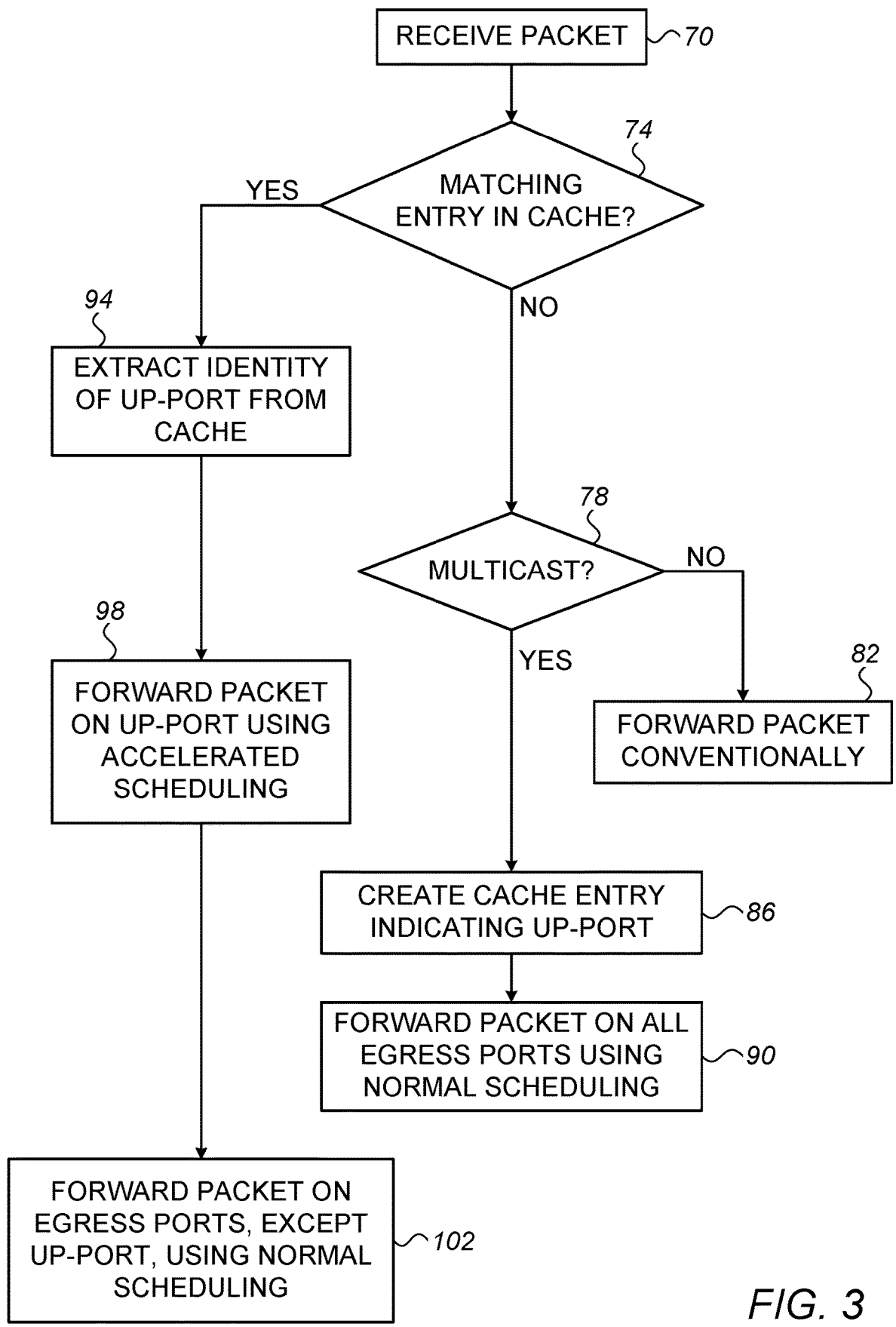
FIG. 3 is a flow chart that schematically illustrates a method for low-latency forwarding of multicast packets, in accordance with an embodiment of the present invention.

FIG. 3 is a flow chart that schematically illustrates a method for low-latency forwarding of MC packets, in accordance with an embodiment of the present invention.

For ease of explanation, reference is now made jointly to FIGS. 2 and 3.

In the example of FIG. 2, forwarding circuitry 40 comprises ingress processing logic 44, MC identification logic 48, highest-latency port identification logic 52, normal scheduling logic 56 and accelerated scheduling logic 60.

The method of FIG. 3 begins with ingress processing logic 44 receiving a packet from a certain ingress port, at an ingress step 70. Logic 44 applies ingress processing to the received packet. As part of the ingress processing, logic 44 checks whether the tuple of the packet (which identifies the flow to which the packet belongs) matches an existing entry in the cache of the ingress port, at a cache-hit checking step 74.

If the received packet does not match any existing cache entry, MC identification logic 48 checks whether the packet is a MC packet, at a MC checking step 78. For example, logic 48 may look-up the list of egress ports. If the list of egress ports comprises more than a single port, logic 48 decides that the packet is an MC packet. If the list of egress ports consists of a single port, logic 48 decides that the packet is a unicast packet. Alternatively, logic 48 may use any other suitable method for determining whether the received packet is a MC packet or not.

If the received packet is not a MC packet, forwarding circuitry 40 forwards the packet using some conventional forwarding scheme that is beyond the scope of the present disclosure, at a conventional forwarding step 82.

If, on the other hand, the received packet is found to be a MC packet, highest-latency port identification logic 52 creates a new cache entry, at a caching step 86. The new cache entry associates the flow with the highest-latency port. In the present example, logic 52 identifies an up-port in the list of egress ports, and indicates the up-port in the cache entry. Logic 52 then forwards the packet to all the egress ports using the normal scheduling process (in the present example using normal scheduling logic 56), at a normal scheduling step 90.

If, at cache-hit checking step 74, the received packet is found to match an existing entry in the cache of the ingress port, logic 52 extracts the identity of the highest-latency port (the up-port in the present example) from the cache entry, at a cache lookup step 94.

Logic 52 forwards the packet to the up-port using the accelerated scheduling process (in the present example using fast scheduling logic 60), at an accelerated scheduling step 98. Logic 52 forwards the packet to the remaining egress ports (all egress ports other than the up-port) using the normal scheduling process (in the present example using normal scheduling logic 56), at a normal scheduling step 102.

The configurations of random network 20, switches 24 and forwarding circuitry 40, as shown in FIGS. 1 and 2 above, are example configurations that are chosen purely for the sake of conceptual clarity. In alternative embodiments, any other suitable configurations can be used. For example, network 20 may have any other suitable topology. Forwarding circuitry 40 may have any other suitable configuration. Moreover, the disclosed techniques are not limited to use in network switches, and may be used in other suitable network elements such routers or bridges, for example.

The various components of the network elements (e.g., switches 24) may be implemented in hardware, e.g., in one or more Application-Specific Integrated Circuits (ASICs) or Field-Programmable Gate Arrays (FPGAs). Additionally or alternatively, some network-element elements can be implemented using software, or using a combination of hardware and software elements.

In some embodiments, some of the network-element functions, e.g., some functions of forwarding circuitry 40, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In various embodiments, forwarding circuitry 40 may look-up the list of egress ports for a certain MC packet or MC flow in various ways. One way is to extract the list from a forwarding table, as described above. Alternatively, forwarding circuitry 40 may look-up the list of egress ports in an Access Control list (ACL) maintained in the switch, or in any other suitable way.

As noted above, the disclosed techniques are not limited to choosing an up-port as the highest-latency port. Consider, for example, SW_B (the spine switch) in FIG. 1. When receiving the MC packet from SW_A via port P1, forwarding circuitry 40 of SW_B filters-out the ingress port, and is therefore left with a single egress port P2 (even though the packet is a MC packet). In such a case, forwarding circuitry 40 of SW_B may choose port P2 as the highest-latency port, and forward the MC packets to this port using the accelerated scheduling process.

In some cases, logic 52 in forwarding circuitry 40 is unable to identify a highest-latency path. In such a case, in some embodiments logic 52 selects one of the egress ports at random, and forwards the MC packet to the selected port using the accelerated scheduling process. For example, in a switch in a FT network, if no up-port exists in the list of egress ports, logic 52 may choose at random one of the down-ports on the list. As another example, if more than a single up-port is found in the list of egress ports, or if there is no clear definition of up-ports, logic 52 may choose at random one of the down-ports on the list.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A packet communication network, comprising multiple packet switches connected together in a multi-layer topology, which includes at least a leaf layer, containing at least first and second leaf switches, and a spine layer, containing at least one spine switch, through which the first and second leaf switches are interconnected,
wherein the first leaf switch comprises:
multiple ports, which are configured to serve as network interfaces for exchanging packets with the network and include at least an up-port leading to the at least one spine switch and multiple down-ports connecting to endpoints of the network; and
forwarding circuitry, which is configured to receive a multicast packet that is to be forwarded via a plurality of the ports, including the up-port and one or more of the down-ports, and to forward the multicast packet to the one or more of the down-ports using a normal scheduling process having a first forwarding latency while forwarding the multicast packet to the up-port using an accelerated scheduling process having a second forwarding latency that is smaller than the first forwarding latency,
wherein the forwarding circuitry is configured to store an entry in a cache memory identifying the up-port as having a highest path latency among paths through the network over which the multicast packet is to be forwarded, and to select the up-port for application of the accelerated scheduling process responsively to looking up the entry in the cache memory.

2. The network according to claim 1, wherein the multi-layer topology comprises a Fat Tree.

3. The network according to claim 1, wherein the multi-layer topology comprises at least one intermediate layer between the leaf layer and the spine layer, and the up-port connects the first leaf switch to the at least one spine switch through at least one of the switches in the at least one intermediate layer.

4. The network according to claim 1, wherein the at least one spine switch is configured, upon receiving the multicast packet from the up-port of the first leaf switch, to forward the multicast packet to the second leaf switch using the accelerated scheduling process.

5. The network according to claim 1, wherein the entry specifies at least a multicast flow to which the multicast packet belongs, and an identity of the path identified as having the highest path latency.

6. A packet switch for deployment as a first leaf switch in a packet communication network, which includes multiple packet switches connected together in a multi-layer topology, including at least a leaf layer, containing at least the first leaf switch and a second leaf switch, and a spine layer, containing at least one spine switch, through which the first and second leaf switches are interconnected, the packet switch comprising:
multiple ports, which are configured to serve as network interfaces for exchanging packets with the network and include at least an up-port leading to the at least one spine switch and multiple down-ports connecting to endpoints of the network; and
forwarding circuitry, which is configured to receive a multicast packet that is to be forwarded via a plurality of the ports, including the up-port and one or more of the down-ports, and to forward the multicast packet to the one or more of the down-ports using a normal scheduling process having a first forwarding latency while forwarding the multicast packet to the up-port using an accelerated scheduling process having a second forwarding latency that is smaller than the first forwarding latency,
wherein the forwarding circuitry is configured to store an entry in a cache memory identifying the up-port as having a highest path latency among paths through the network over which the multicast packet is to be forwarded, and to select the up-port for application of the accelerated scheduling process responsively to looking up the entry in the cache memory.

7. The switch according to claim 6, wherein the entry specifies at least a multicast flow to which the multicast packet belongs, and an identity of the path identified as having the highest path latency.

8. A method for communication, comprising:
connecting multiple packet switches together in a network having a multi-layer topology, which includes at least a leaf layer, containing at least first and second leaf switches, and a spine layer, containing at least one spine switch, through which the first and second leaf switches are interconnected, wherein the first leaf switch comprises at least an up-port leading to the at least one spine switch and multiple down-ports connecting to endpoints of the network; and receiving in the first leaf switch a multicast packet that is to be forwarded via a plurality of the ports, including the up-port and one or more of the down-ports;

forwarding the multicast packet to the one or more of the down-ports using a normal scheduling process having a first forwarding latency; and forwarding the multicast packet to the up-port using an accelerated scheduling process having a second forwarding latency that is smaller than the first forwarding latency, wherein forwarding the multicast packet to the up-port comprises storing an entry in a cache memory identifying the up-port as having a highest path latency among paths through the network over which the multicast packet is to be forwarded, and selecting the up-port for application of the accelerated scheduling process responsively to looking up the entry in the cache memory.

9. The method according to claim 8, wherein the multi-layer topology comprises a Fat Tree.

10. The method according to claim 8, wherein the multi-layer topology comprises at least one intermediate layer between the leaf layer and the spine layer, and the up-port connects the first leaf switch to the at least one spine switch through at least one of the switches in the at least one intermediate layer.

11. The method according to claim 8, and comprising, upon receiving the multicast packet in the at least one spine switch from the up-port of the first leaf switch, forwarding the multicast packet from the at least one spine switch to the second leaf switch using the accelerated scheduling process.

12. The method according to claim 8, wherein the entry specifies at least a multicast flow to which the multicast packet belongs, and an identity of the path identified as having the highest path latency.

\* \* \* \* \*